(12) United States Patent
Asahina et al.

(10) Patent No.: US 8,859,139 B2
(45) Date of Patent: Oct. 14, 2014

(54) ALKALINE STORAGE BATTERY

(75) Inventors: Takashi Asahina, Toyohashi (JP); Shinji Hamada, Toyohashi (JP); Toyohiko Eto, Toyota (JP); Masanori Ito, Toyohashi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1318 days.

(21) Appl. No.: 11/751,989

(22) Filed: May 22, 2007

(65) Prior Publication Data

US 2007/0275301 A1 Nov. 29, 2007

(30) Foreign Application Priority Data

May 23, 2006 (JP) ................. 2006-143038

(51) Int. Cl.
*H01M 2/02* (2006.01)
*H01M 2/08* (2006.01)

(52) U.S. Cl.
USPC ............................ 429/181; 429/179; 429/185

(58) Field of Classification Search
USPC .................................. 429/180, 181, 185, 179
See application file for complete search history.

(56) References Cited

U.S. PATENT DOCUMENTS

| 5,770,332 | A | * | 6/1998 | Narukawa et al. | ............ | 429/175 |
| 5,856,041 | A | * | 1/1999 | Inoue et al. | .................. | 429/182 |
| 6,485,256 | B1 | * | 11/2002 | Iketani | ........................ | 415/113 |
| 6,777,129 | B2 | | 8/2004 | Komori et al. | | |
| 7,432,010 | B2 | * | 10/2008 | Dokko | ........................... | 429/53 |
| 7,700,229 | B2 | * | 4/2010 | Hamada et al. | ............... | 429/174 |

FOREIGN PATENT DOCUMENTS

| JP | 56145655 | * | 11/1981 |
| JP | 9-161761 A | | 6/1997 |
| JP | 11-307064 A | | 11/1999 |
| JP | 2001-313066 A | | 11/2001 |
| JP | 2002190295 | * | 7/2002 |
| JP | 2003-156149 | * | 5/2003 |
| JP | 2003-249232 A | | 9/2003 |
| JP | 2003-272589 A | | 9/2003 |

* cited by examiner

*Primary Examiner* — Ula C. Ruddock
*Assistant Examiner* — Thomas H. Parsons
(74) *Attorney, Agent, or Firm* — Sughrue Mion, PLLC

(57) ABSTRACT

An alkaline storage battery has an electrode terminal that is inserted in a penetration hole, and disposed astride an inside of a battery case and an outside of the battery case, and fastened to a hole periphery portion via a packing. The negative terminal has a seal portion that, together with the hole periphery portion, clamps and compresses the packing to liquid-tightly seal the penetration hole. The seal portion includes an annular seal surface located facing the hole periphery portion, and a seal periphery surface located around the seal surface. The seal surface is protruded from the seal periphery surface toward the hole periphery portion. The surface roughness Ry of the seal surface of the negative terminal is 15 μm or less.

2 Claims, 9 Drawing Sheets

ALKALINE STORAGE BATTERY

INCORPORATION BY REFERENCE

The disclosure of Japanese Patent Application No. 2006-143038 filed on May 23, 2006, including the specification, drawings and abstract is incorporated herein by reference in its entirety.

BACKGROUND OF THE INVENTION

1. Field of Invention

The invention relates to an alkaline storage battery.

2. Description of Related Art

In recent years, various alkaline storage batteries have been developed. For example, Japanese Patent Application Publication No. JP-A-2001-313066 discloses an alkaline storage battery in which an electrode body formed by alternately stacking a plurality of positive plates and a plurality of negative plates with one separator disposed between every two plates is housed in a rectangular parallelepiped-shape battery case. This alkaline storage battery has electrode terminals (a positive terminal and a negative terminal) that are disposed astride the inside and the outside of the case through penetration holes penetrating a lid of the case.

In the alkaline storage batteries, due to the use of an alkaline electrolyte, a so-called electrolyte solution creep phenomenon occurs in which the electrolyte solution in the case creeps up the surfaces of the electrode terminals. This phenomenon is remarkable particularly in the negative terminal. Therefore, in the alkaline storage battery shown in Japanese Patent Application Publication No. JP-A-2001-313066, if the sealing of a penetration hole in which an electrode terminal is inserted is not sufficient, the electrolyte solution may leak out along the surfaces of the electrode terminals after a long time of use due to the creep phenomenon of the electrolyte solution.

Japanese Patent Application Publication No. JP-A-2003-272589 discloses a closed-type alkaline storage battery that has good seal characteristic, and restrains the seepage of the electrolyte solution from inside the battery, and operates a safety valve appropriately. In this closed type alkaline storage battery, in order to prevent leakage of the electrolyte solution via the safety valve, a surface roughness Ra is prescribed regarding a region in an opening closure plate which contacts a protection portion of the valve body. However, the surface roughness Ra, being an representation of an arithmetic average from an average line of a roughness curve, is not suitable to prescribe the surface roughness of a seal portion of an electrode terminal (a site that prevents the alkaline electrolyte from leaking out along the surfaces of the electrode terminal) that has undergone complicated forming (deep draw molding or the like). A reason therefor is that an electrode terminal having undergone complicated molding (deep draw molding or the like) may sometimes have local roughening of the surface of the seal portion to great extent due to occurrence of cracks and the like, and in such a case, the alkaline electrolyte may leak out via a site where cracks or the like occur, even if the value of Ra is small.

SUMMARY OF THE INVENTION

It is an object of the invention to provide an alkaline storage battery in which the leakage of the electrolyte solution to the outside along the surfaces of the electrode terminals is restrained.

A first aspect of the invention relates to an alkaline storage battery. This alkaline storage battery includes: a battery case that has an external wall portion which has an inside surface and an outside surface, and which includes a penetration hole penetrating between the inside surface and the outside surface; a packing that intimately contacts a hole periphery portion of the external wall portion that surrounds the penetration hole; an electrode terminal inserted in the penetration hole, and disposed astride an inside of the battery case and an outside of the battery case, and fastened to the hole periphery portion via the packing, the electrode terminal having a seal portion that, together with the hole periphery portion, clamps and compresses the packing to liquid-tightly seal the penetration hole, the seal portion including an annular seal surface located facing the hole periphery portion, and a seal periphery surface located around the seal surface, and the seal surface being protruded from the seal periphery surface toward the hole periphery portion; and an alkaline electrolyte located in the battery case. In this alkaline storage battery, a surface roughness Ry of the seal surface of the electrode terminal is 15 μm or less.

The electrode terminal of the alkaline storage battery in accordance with the first aspect has a seal portion that clamps and compresses the packing in cooperation with the hole periphery portion surrounding the penetration hole in the external wall portion so that the packing liquid-tightly seals the penetration hole. The seal portion has a seal surface that is protruded from the seal periphery surface toward the hole periphery portion. Therefore, particularly on the seal surface, the packing can be locally compressed to liquid-tightly seal the penetration hole.

If the surface roughness of the seal surface of the electrode terminal is large (if the surface is rough), the liquid tightness for the electrolyte solution between the seal surface and the packing becomes insufficient. In such a case, due to the creep phenomenon of the alkaline electrolyte on the electrode terminal, the alkaline electrolyte will likely leak out along the surfaces of the electrode terminal.

However, in the alkaline storage battery in accordance with the first aspect of the invention, the surface roughness Ry of the seal surface of the electrode terminal is 15 μm or less. By keeping small the surface roughness of the electrode terminal in this manner, the liquid tightness for the electrolyte solution between the seal surface and the packing becomes good, so that the leakage of the alkaline electrolyte to the outside along the surfaces of the electrode terminal can be restrained. Incidentally, the surface roughness Ry is a parameter that indicates the surface roughness defined in JIS B 0601 and JIS B 0031. The value Ry, unlike the value Ra, represents the difference between a peak line and a trough line of the roughness curve (maximum height). Therefore, even in the case where the electrode terminal is molded by a complicated molding process (deep draw molding or the like) that is likely to cause cracks, the surface roughness of the seal surface can be appropriately evaluated against the leakage of the alkaline electrolyte.

A second aspect of the invention relates to an alkaline storage battery. This alkaline storage battery includes: a battery case that has an external wall portion which has an inside surface and an outside surface, and which includes a penetration hole penetrating between the inside surface and the outside surface; a packing that intimately contacts a hole periphery portion of the external wall portion that surrounds the penetration hole; an electrode terminal inserted in the penetration hole, and disposed astride an inside of the battery case and an outside of the battery case, and fastened to the hole periphery portion via the packing, the electrode terminal having a seal portion that, together with the hole periphery portion, clamps and compresses the packing to liquid-tightly seal the penetration hole, the seal portion including an annular seal surface located facing the hole periphery portion, and a seal periphery surface located around the seal surface, and the seal surface being protruded from the seal periphery surface toward the hole periphery portion; and an alkaline electrolyte located in the battery case. In the electrode terminal, at least the seal portion is formed by press molding of a metal sheet, and the seal surface of the seal portion is subjected to a surface roughness reducing process through pressurization surface correction during or after the molding of the seal portion.

In the alkaline storage battery in accordance with the second aspect of the invention, at least the seal portion of the electrode terminal is formed by press-molding a metal sheet. Incidentally, there are cases where the entire or a portion of the seal surface of the seal portion remains out of contact with the die when the seal portion is formed by press-molding a metal sheet. In such a case, the surface roughness of the seal surface becomes large (the surface becomes rough), so that the liquid tightness for the electrolyte solution between the seal surface and the packing may sometimes become insufficient.

However, in the alkaline storage battery in accordance with the second aspect of the invention, the seal surface of the seal portion is subjected to the surface roughness reducing process through pressurization surface correction during or after the molding of the seal portion. This reduces the surface roughness of the seal surface of the seal portion, so that good liquid tightness for the electrolyte solution between the seal surface and the packing can be achieved. Therefore, the leakage of the alkaline electrolyte to the outside along the surfaces of the electrode terminal can be restrained.

The surface roughness reducing process through pressurization surface correction during the molding of the seal portion refers to a process in which during the molding of the seal portion, through the use of a die having such a configuration that the seal surface contacts a contact surface of the die, and is molded in accordance with the shape of the contact surface, the seal surface is molded on the contact surface of the die while being pressed against the contact surface. The surface roughness reducing process through pressurization surface correction after the molding of the seal portion refers to a process in which after the seal portion is molded, the seal surface is pressed against the contact surface of the die for correction of the surface.

A third aspect of the invention relates to an alkaline storage battery. This alkaline storage battery includes: a battery case that has an external wall portion which has an inside surface and an outside surface, and which includes a penetration hole penetrating between the inside surface and the outside surface; a packing that intimately contacts a hole periphery portion of the external wall portion that surrounds the penetration hole; an electrode terminal inserted in the penetration hole, and disposed astride an inside of the battery case and an outside of the battery case, and fastened to the hole periphery portion via the packing, the electrode terminal having a seal portion that together with the hole periphery portion, clamps and compresses the packing to liquid-tightly seal the penetration hole, the seal portion including an annular seal surface located facing the hole periphery portion, and a seal periphery surface located around the seal surface, and the seal surface being protruded from the seal periphery surface toward the hole periphery portion; and an alkaline electrolyte located in the battery case. In the electrode terminal, at least the seal portion is formed by the press molding of a metal sheet, and the seal surface of the seal portion is ground after the molding of the seal portion.

In the alkaline storage battery of the third aspect of the invention, the seal surface of the seal portion of the electrode terminal is ground after the seal portion has been molded. This reduces the surface roughness of the seal surface of the seal portion, so that good liquid tightness for the electrolyte solution between the seal surface and the packing can be achieved. Therefore, the leakage of the alkaline electrolyte to the outside along the surfaces of the electrode terminal can be restrained. Incidentally, the grinding of the seal surface is also an aspect of the surface roughness reducing process in the invention. Examples of the grinding of the seal surface include barrel plating, buff grinding, etc.

In the alkaline storage battery in accordance with any one of the first to third aspects of the invention, the surface roughness Ry of the seal surface of the electrode terminal may be 15 μm or less. If the surface roughness of the seal surface of the electrode terminal is reduced to 15 μm or less, good liquid tightness for the electrolyte solution between the seal surface and the packing is achieved, so that the leakage of the alkaline electrolyte to the outside along the surfaces of the electrode terminal can be restrained.

The electrode terminal of the alkaline storage battery in accordance with any one of the first to third aspects of the invention may be formed by deep draw molding of a metal sheet.

In the alkaline storage battery in accordance with any one of the first to third aspects of the invention, the electrode terminal is formed by the deep draw molding of a metal sheet. In the case of the electrode terminal is deep-draw-molded, the surface roughness of the seal surface of the seal portion, in particular, is likely to become rough at the time of molding. Furthermore, the seal surface may sometimes locally become rough to great extent due to occurrence of cracks or the like. In such a case, the alkaline electrolyte sometimes leak out through the site of rough surface even if the value of the surface roughness Ra of the seal surface is small.

However, in the alkaline storage battery in accordance with any one of the first to third aspects of the invention, the value Ry representing the difference (maximum height) between a peak line and a trough line of the roughness curve is used as parameter that indicates the surface roughness of the seal surface of the electrode terminal, and the surface roughness Ry of the seal surface is prescribed to be 15 μm or less. Therefore, although the electrode terminal formed by deep draw molding is used, good liquid tightness for the electrolyte solution between the seal surface and the packing can be achieved, so that the leakage of the alkaline electrolyte to the outside along the surfaces of the electrode terminal can be restrained. Furthermore, in the alkaline storage battery in accordance with any one of the first to third aspects of the invention, the seal surface is subjected to the surface roughness reducing process through pressurization surface correction or to the grinding. This reduces the surface roughness of at least the seal surface, so that the leakage of the alkaline electrolyte to the outside along the surfaces of the electrode terminal can be restrained.

A fourth aspect of the invention relates to an alkaline storage battery. This alkaline storage battery includes: a battery case that has an external wall portion which has an inside surface and an outside surface, and which includes a penetration hole penetrating between the inside surface and the outside surface; a packing that intimately contacts a hole periphery portion of the external wall portion that surrounds the penetration hole; an electrode terminal inserted in the penetration hole, and disposed astride an inside of the battery case and an outside of the battery case, and fastened to the hole periphery portion via the packing, the electrode terminal having a seal portion that, together with the hole periphery portion, clamps and compresses the packing to liquid-tightly seal the penetration hole, the seal portion including an annular seal surface located facing the hole periphery portion, and a seal periphery surface located around the seal surface, and the seal surface being protruded from the seal periphery surface toward the hole periphery portion; and an alkaline electrolyte located in the battery case. In the electrode terminal, at least the seal portion is formed by press molding of a metal sheet containing iron as a main component, and the seal surface of the seal portion is made of a nickel plating layer provided after the molding of the seal portion.

In the alkaline storage battery in accordance with the fourth aspect of the invention, at least the seal portion of the electrode terminal is formed by press-molding a metal sheet containing iron as a main component. Incidentally, a phenomenon in which the alkaline electrolyte leaks out along the surfaces of the electrode terminal due to the creep phenomenon of the alkaline electrolyte becomes likely to occur particularly if iron is exposed in the seal surface of the electrode terminal. In the case where the seal portion is formed by press-molding a steel sheet such as a cold-rolled steel sheet, it is a matter of course that iron is exposed in the seal surface. In the case where the seal portion is formed by press-molding a nickel-plated steel sheet (a steel sheet whose surface is plated with nickel), it also sometimes happen that cracks or the like occur in the nickel plating of the seal surface and iron is thus exposed in the seal surface.

However, in the alkaline storage battery in accordance with the fourth aspect of the invention, the seal surface of the seal portion is constructed of a nickel plating layer provided after the molding of the seal portion. This prevents the exposure of iron in the seal surface, so that the creep phenomenon of the alkaline electrolyte on the seal surface can be restrained. Therefore, the leakage of the alkaline electrolyte to the outside along the surfaces of the electrode terminal can be restrained. Incidentally, examples of the metal sheet containing iron as a main component include cold-rolled steel sheets, such as SPCE or the like, a nickel mesh steel sheet whose surface is plated with nickel.

In the seal portion of the alkaline storage battery, a coated surface that is coated with the nickel plating layer that forms the seal surface may be subjected to a surface roughness reducing process through pressurization surface correction during or after the molding of the seal portion.

In the alkaline storage battery in accordance with the fourth aspect of the invention, the coated surface of the seal portion is subjected to the surface roughness reducing process through pressurization surface correction during or after the molding of the seal portion. This reduces the surface roughness of the coated surface, and therefore also reduces the surface roughness of the seal surface constructed of the nickel plating layer that coats the coated surface. Therefore, the leakage of the alkaline electrolyte to the outside along the surfaces of the electrode terminal can be further restrained.

In the seal portion of the alkaline storage battery in accordance with the fourth aspect of the invention, the coated surface that is coated with the nickel plating layer that forms the seal surface may be ground after the molding of the seal portion.

In such an alkaline storage battery, the coated surface of the seal portion is ground after the molding of the seal portion. This reduces the surface roughness of the coated surface, and therefore also reduces the surface roughness of the seal surface constructed of the nickel plating layer that coats the coated surface. Therefore, the leakage of the alkaline electrolyte to the outside along the surfaces of the electrode terminal can be further restrained.

Furthermore, the electrode terminal of the alkaline storage battery in accordance with the fourth aspect of the invention may be formed by deep draw molding of a metal sheet containing iron as a main component.

In the alkaline storage battery of the invention, the electrode terminal is formed by the deep draw molding of a metal sheet. In the case where the electrode terminal is deep-draw-molded, the surface of the coated surface of the seal portion (a surface coated with the nickel plating layer that constitutes the seal surface) in particular is liable to become rough. However, in the alkaline storage battery of the invention, the coated surface is subjected to the surface roughness reducing process through pressurization surface correction or to the grinding as mentioned above. This reduces the surface roughness of at least the coated surface, and therefore also reduces the surface roughness of the seal surface constructed of the nickel plating layer that coats the coated surface. Therefore, the leakage of the alkaline electrolyte to the outside along the surfaces of the electrode terminal can be restrained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Embodiments of the invention will now be described. This embodiment will be described with reference to a nickel-metal hydride storage battery as an example of the alkaline storage battery. The leakage of an alkaline electrolyte along the surfaces of an electrode terminal will be described regarding a negative terminal on which the alkaline electrolyte creep phenomenon is remarkable.

Figure 1:
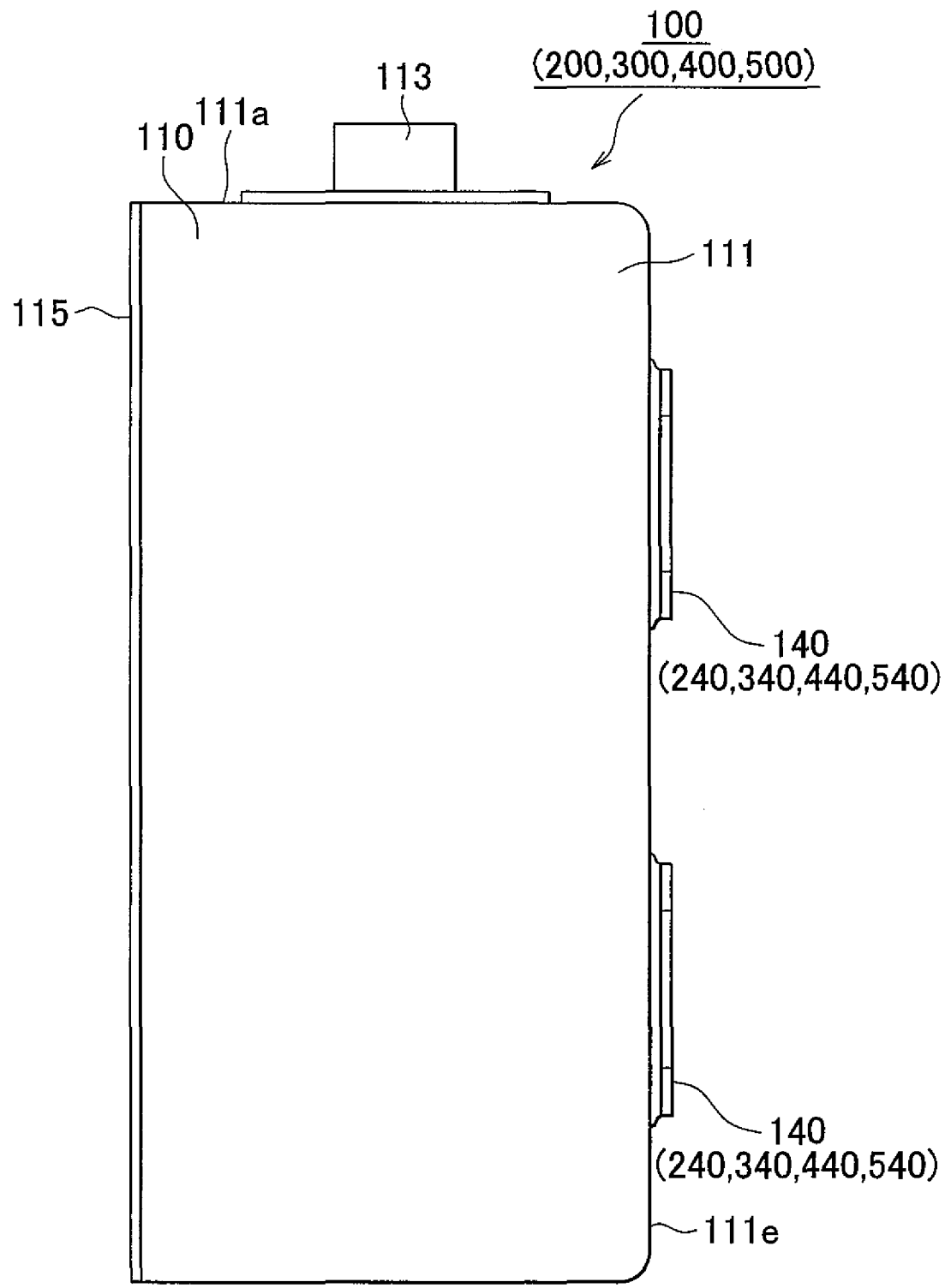
FIG. 1 is a front view of an alkaline storage battery 100 to 500 in accordance with Embodiments 1 to 5.
Figure 2:
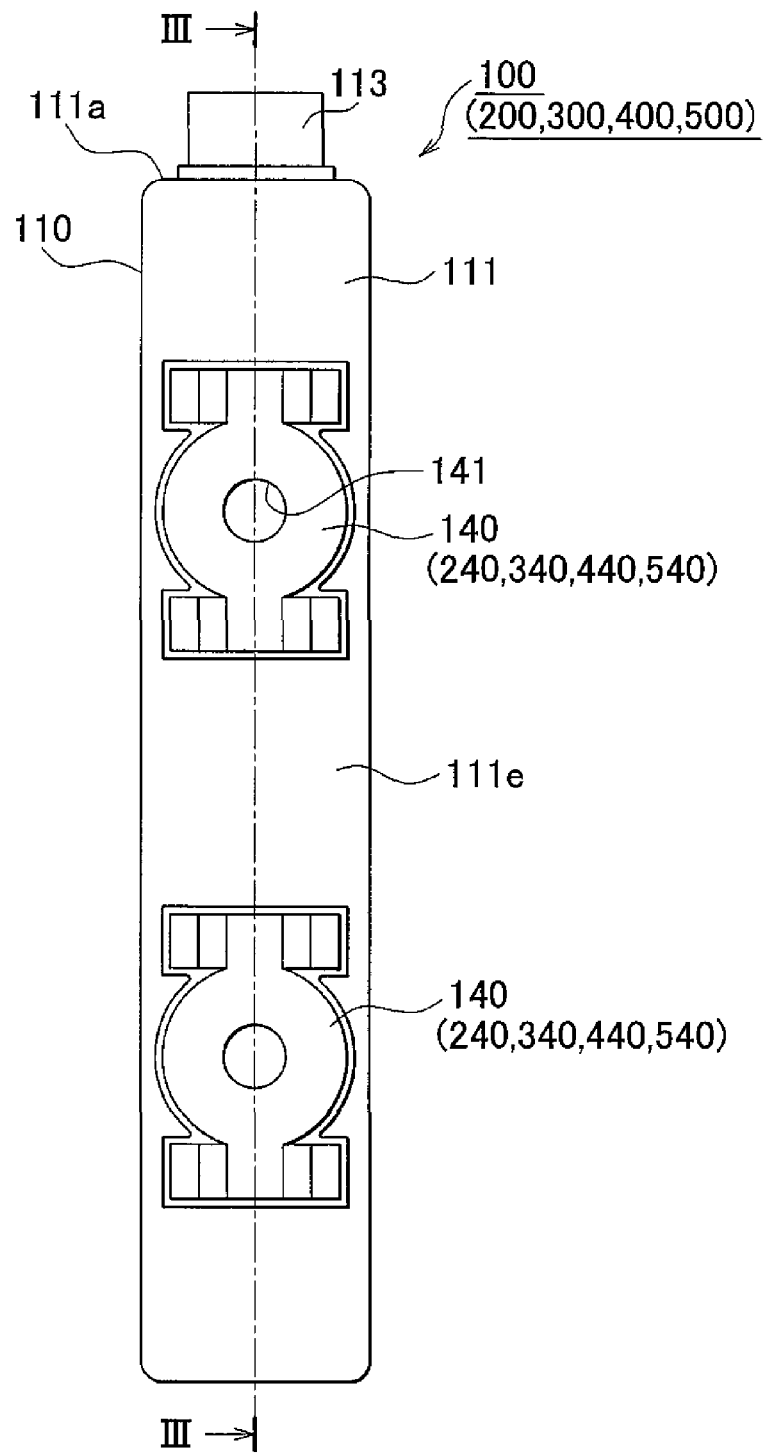
FIG. 2 is a side view of the alkaline storage battery 100 to 500 in accordance with Embodiments 1 to 5.
Figure 3:
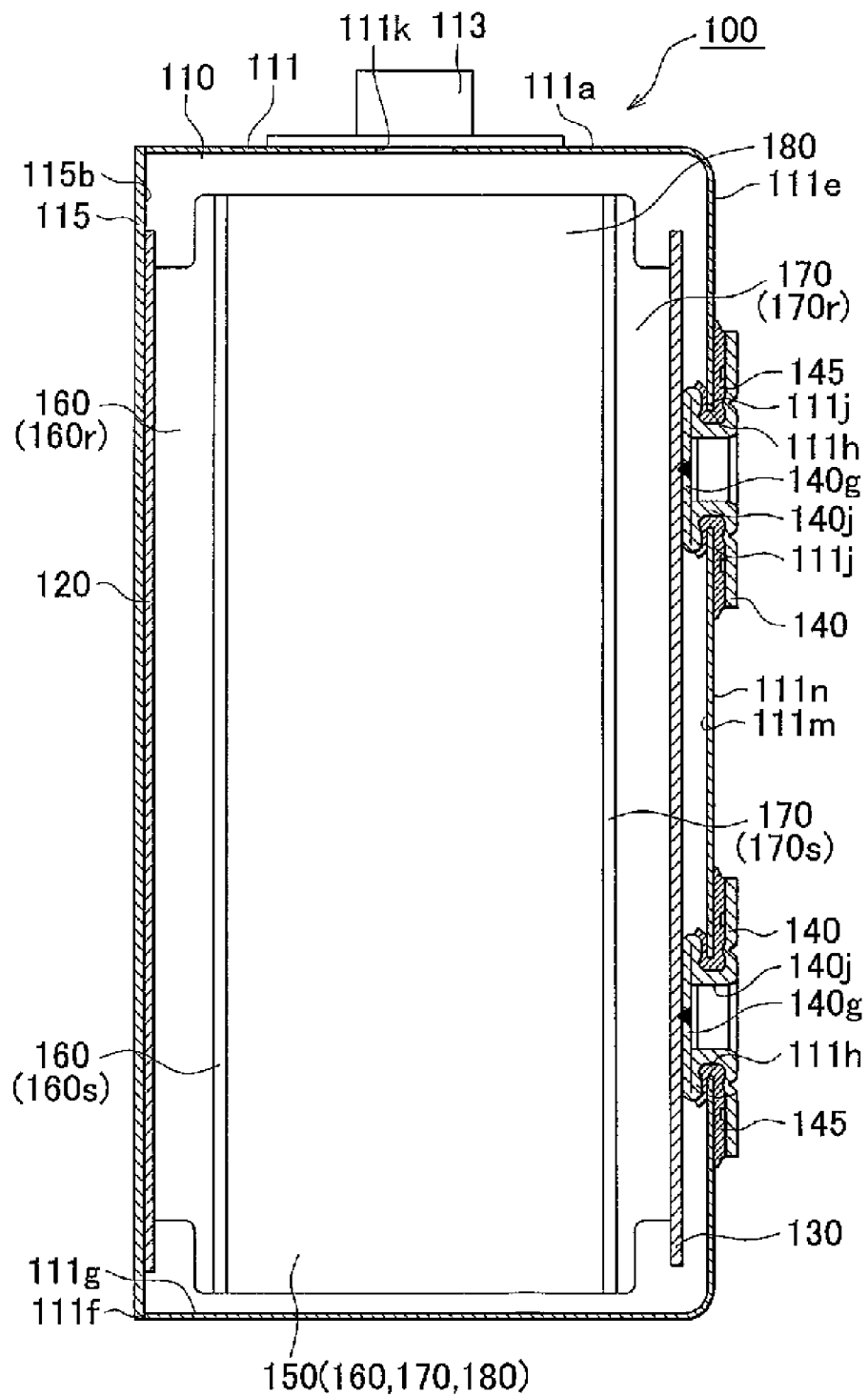
FIG. 3 is a sectional view of the alkaline storage battery 100 in accordance with Embodiment 1, corresponding to a sectional view taken on line III-III in FIG. 2.

(Embodiment 1) FIG. 1 is a front view of an alkaline storage battery 100 in accordance with Embodiment 1. FIG. 2 is a side view thereof. FIG. 3 is a sectional view thereof (corresponding to a sectional view taken along line III-III in FIG. 2). The alkaline storage battery 100 in accordance with Embodiment 1 is a square-shape closed type nickel-metal hydride storage battery that includes a battery case 110 made of a metal (e.g., a nickel-plated steel sheet), negative terminals 140, a safety valve 113, and an electrode body 150 (see FIG. 3) and an alkaline electrolyte (not shown) that are disposed within the battery case 110. The alkaline electrolyte used in the battery may be, for example, an alkaline aqueous solution whose main component is KOH and whose specific weight is 1.2 to 1.4.

The battery case 110 is made of a metal (e.g., a nickel-plated steel sheet) and, as shown in FIG. 3, has a battery container 111 having a rectangular box shape, and an opening closure member 115 made of a metal (e.g., a nickel-plated steel sheet) and having a rectangular plate shape. In the battery case 110, a side wall portion 111e (an external wall portion that is located on the right side in FIG. 3) of the battery container 111 has two penetration holes 111h that penetrate through between an inside surface 111m and an outside surface 111n. Into each penetration hole 111h, a negative terminal 140 is fitted with a packing 145 that is made of an electrically insulating rubber. The opening closure member 115 is fixed to and thus closes an opening portion 111g of the battery container 111 by welding the whole periphery of the opening closure member 115 to an opening end 111f (see FIG. 3) of the battery container 111 while being placed in contact with the opening end portion 111f. Therefore, the opening closure member 115 and the battery container 111 are integrated to form the battery case 110.

An electrode body 150 is made up of a plurality of positive plates 160 and a plurality of negative plates 170 which are alternately stacked with a separator 180 interposed between each adjacent two of the positive and negative plates. Of these components, each positive plate 160 has a positive-electrode filled portion 160s in which a positive electrode substrate is filled with a positive electrode active material, and a positive electrode junction end 160r in which the positive electrode substrate is not filled with a positive electrode active material. Each positive plate 160 is disposed so that the positive electrode junction end portion 160r extends out in a predetermined direction (leftward in FIG. 3). In Embodiment 1, a foamed nickel substrate is used as the positive electrode substrate. As the positive electrode active material, an active material containing nickel hydroxide is used.

The negative plate 170 has a negative-electrode filled portion 170s in which a negative electrode substrate (e.g., a punched metal plate or the like) is filled with a hydrogen-absorbing alloy or the like, and a negative electrode junction end portion 170r in which the negative electrode substrate is not filled with a hydrogen-absorbing alloy or the like. Each negative plate 170 is disposed so that the negative electrode junction end portion 170r extends out in a direction (rightward in FIG. 3) opposite to the direction of the positive electrode junction end portion 160r. As the separators 180, for example, a non-woven fabric made of a hydrophilized synthetic fiber may be used.

The negative electrode junction end portion 170r of each negative plate 170 is joined to a rectangular plate-shaped negative collector member 130 by electron beam welding or the like. Furthermore, the negative collector member 130 is joined to the negative terminals 140 by laser welding or the like. Therefore, the negative terminals 140 and the negative plates 170 are electrically connected through the negative collector member 130. The positive electrode junction end portion 160r of each positive plate 160 is joined to a rectangular plate-shaped positive collector member 120 by electron beam welding or the like. Furthermore, the positive collector member 120 is joined to the opening closure member 115 by electron beam welding or the like. Therefore, in the alkaline storage battery 100 of Embodiment 1, the whole battery case 110, including the opening closure member 115, acts as a positive pole.

Figure 4:
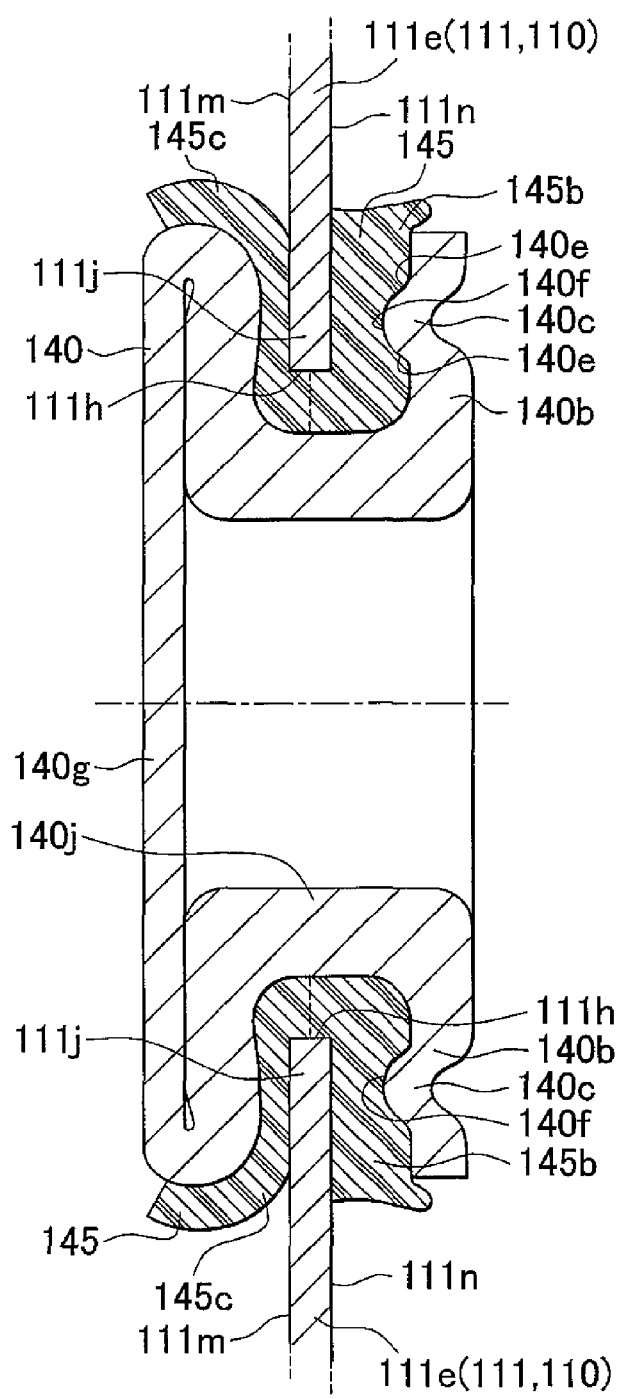
FIG. 4 is an enlarged sectional view of a negative terminal 140.

Now, the negative terminals 140 and the packings 145 in Embodiment 1 will be described in detail. The packing 145 of each negative terminal 140, as shown in FIG. 4, is disposed in intimate contact with an annular hole periphery portion 111j of the penetration hole 111h, which is formed in the side wall portion 111e of the battery case 110. The packing 145 has a ring-shaped flange portion 145b that is positioned outside the battery case 110, and a flange worked portion 145c that is positioned inside the battery case 110.

As shown in FIG. 4, each negative terminal 140 has a cylinder-shape internal cylinder portion 140j that is located inside the penetration hole 111h with the packing 145 disposed therebetween, a ring-shape brim portion 140b that is larger in diameter than the penetration hole 111h and that is located on an end side of the internal cylinder portion 140j (the right side thereof in FIG. 4), and a disc-shape squeezed portion 140g that is larger in diameter than the penetration hole 111h and that is located on another end side of the internal cylinder portion 140j (the left side thereof in FIG. 4).

Among these portions, the squeezed portion 140g, together with the hole periphery portion 111j of the side wall portion 111e, clamps and compresses the flange worked portion 145c of the packing 145, on the inside surface 111m side of the side wall portion 111e. Likewise, the brim portion 140b, together with the hole periphery portion 111j, clams and compresses the flange portion 145b of the packing 145, on the outside surface 111n of the side wall portion 111e. Therefore, the penetration hole 111h can be sealed liquid-tightly.

Figure 5:
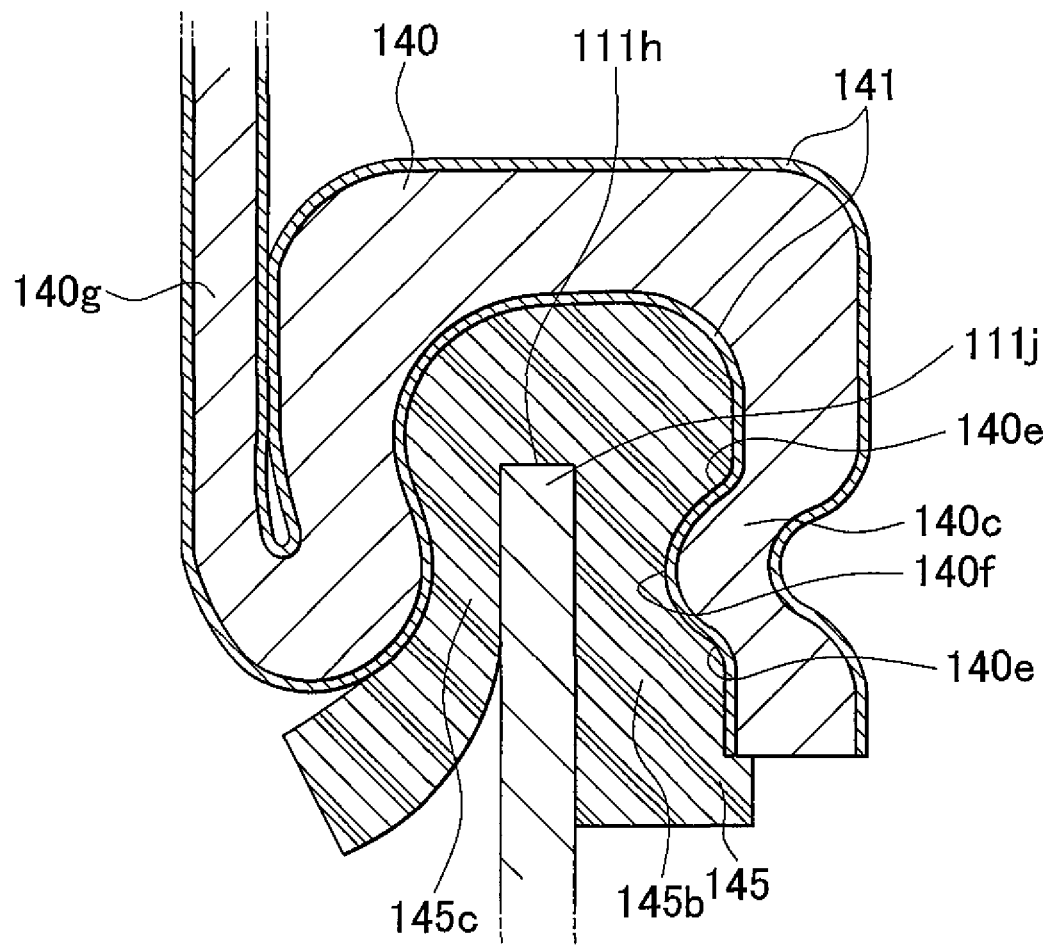
FIG. 5 is an enlarged sectional view of a seal portion of the negative terminal 140.

In particular, the brim portion 140b of each negative terminal 140, as shown in FIG. 4, has at or near the middle thereof in the radial direction an annular seal portion 140c that has an arch shape in section. The seal portion 140c, as shown in FIG. 5, has a seal periphery surface 140e, and a seal surface 140f that is protruded from the seal periphery surface 140e toward the hole periphery portion 111j. Therefore, in particular, the seal surface 140f can locally compresses the flange portion 145b of the packing 145 to liquid-tightly seal the penetration hole 111h.

Since the alkaline storage battery 100 of Embodiment 1 uses an alkaline electrolyte, there occurs a so-called creep phenomenon in which the alkaline electrolyte in the battery case 110 creeps up the surfaces of the negative terminals 140. This creep phenomenon is likely to occur if iron is exposed in surfaces of the negative terminals. Particularly, if iron is exposed in the seal surface of a negative terminal, it is likely that the alkaline electrolyte will leak out along the surface of the negative terminal due to the creep phenomenon of the alkaline electrolyte.

However, in Embodiment 1, although each negative terminal 140, including the seal portion 140c, is formed by the press molding (e.g., deep draw molding) of a metal sheet material (SPCE in Embodiment 1) that contains iron as a main component, the surfaces of the negative terminal 140 that includes the seal surface 140f are molded by nickel plating layers 141 provided after the press molding (e.g., deep draw molding), as shown in FIG. 5. Therefore, the exposure of iron in the surfaces of each negative terminal 140 can be prevented, so that the creep phenomenon of the alkaline electrolyte on the negative terminals 140 can be restrained. In particular, since the exposure of iron in the seal surface 140f can be prevented, the leakage of the alkaline electrolyte to the outside along the surfaces of the negative terminals 140 can be particularly restrained.

When the seal portion is formed by press-molding a metal sheet material, the whole seal surface or a portion thereof sometimes is molded without contacting the die. In such a case, the surface roughness of the seal surface increases (the surface becomes rough), the liquid tightness for the electrolyte solution between the seal surface and the packing sometimes becomes insufficient. When the negative terminals are formed by deep draw molding, the seal surfaces of seal portions are prone to become rough.

Figure 6:
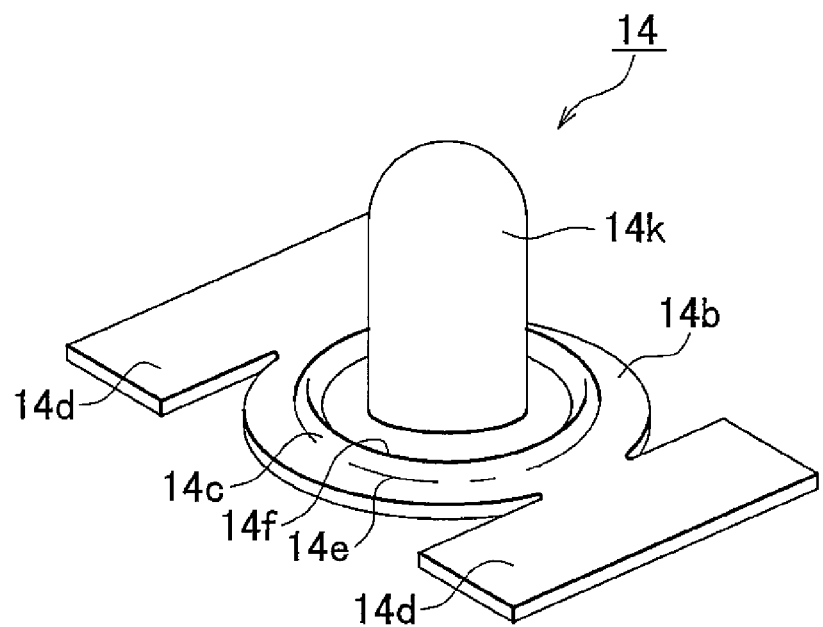
FIG. 6 is a perspective view of a negative terminal substrate 14.

In contrast, the alkaline storage battery of Embodiment 1 was actually formed by performing the press molding (e.g., deep draw molding) of a negative terminal substrate 14 (a negative terminal substrate before being provided with a nickel plating layer 141; see FIG. 6), and then performing a surface roughness reducing process through pressurization surface correction on a protruded surface 14f of the negative terminal substrate 14 (a surface that is later coated with a nickel plating layer 141 that forms the seal surface 140f). Due to this process, the surface roughness of the protruded surface 14f was made small.

Therefore, when the surfaces of the negative terminal substrate 14 are provided with the nickel plating layer 141 so as to form the negative terminal 140, the surface roughness Ry of the seal surface 140f formed by the nickel plating layer 141 that coats the protruded surface 14f was successfully reduced to about 3 μm (an average value from thirty negative terminals 140). Due to this, the liquid tightness for the alkaline electrolyte becomes good between the seal surface 140f and the packing 145, so that the leakage of the alkaline electrolyte to the outside along the surface of the negative terminal 140 can be restrained.

Figure 11:
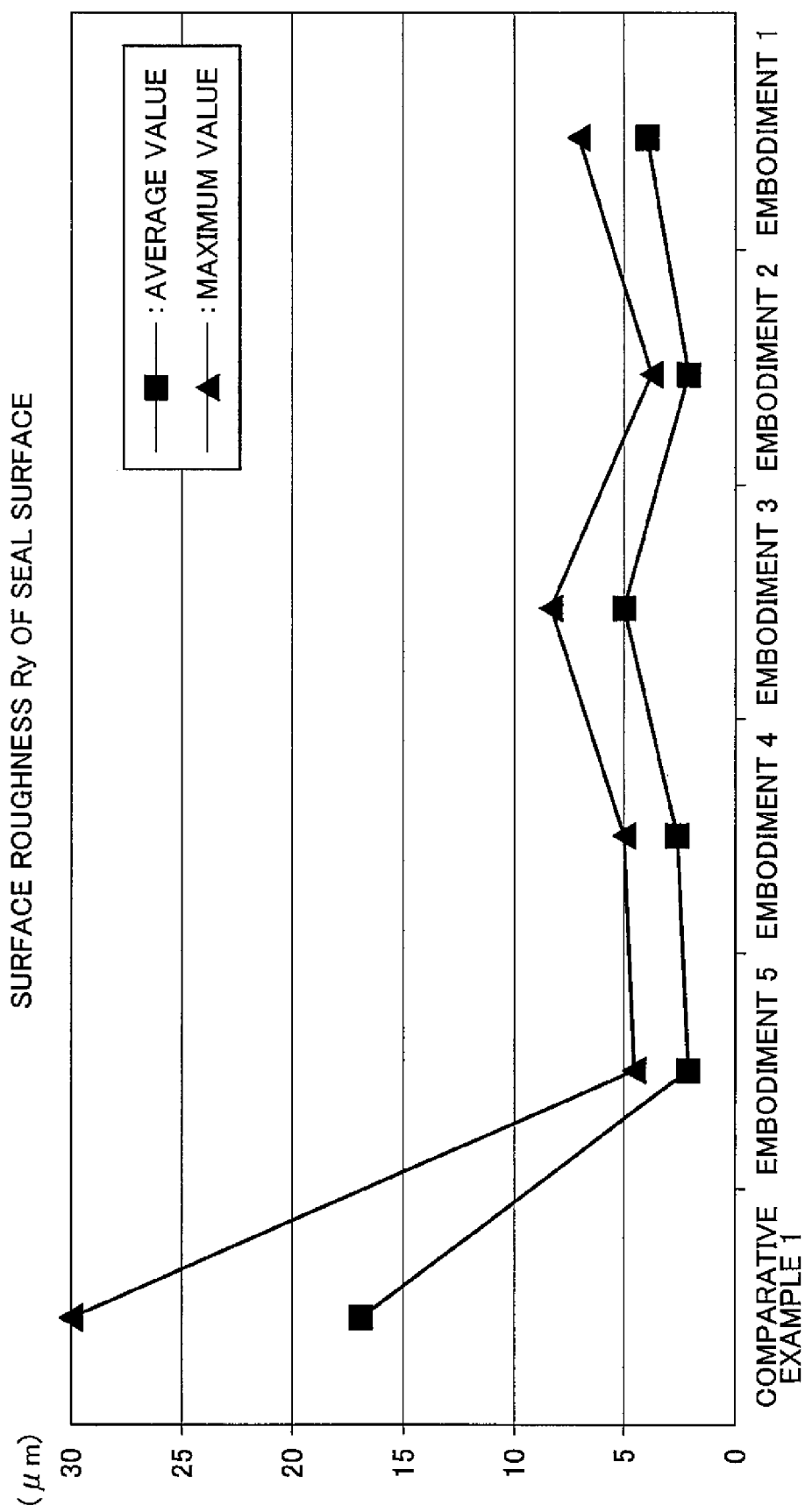
FIG. 11 is a graph indicating the surface roughnesses Ry of seal surfaces.

In this embodiment, thirty negative terminals 140 according to Embodiment 1 were prepared, and the surface roughness Ry of the seal surface 140f of each negative terminal 140 was measured, and an average value therefrom was calculated. Thirty negative terminals 240 to 540 according to each of Embodiments 2 to 5 were prepared, and an average value of the surface roughness Ry of the seal surface from each thirty terminals was calculated as in the negative terminals 140 according to Embodiment 1. Results are shown by "■" (solid square) in FIG. 11. FIG. 11 further shows the maximum values of the surface roughness Ry of the seal surfaces in Embodiments 1 to 5 and Comparative Example 1 by "▲" (solid triangle).

The alkaline storage battery 100 of Embodiment 1 is produced as follows. Firstly, a plurality of positive plate 160 and a plurality of negative plates 170 are stacked alternately with a separator 180 disposed between every two plates, and the stack was pressurized and shaped so as to make an electrode body 150. Next, the positive plate 160 of the electrode body 150 and the positive collector member 120 are welded by electron beam welding, and the negative plates 170 and the negative collector member 130 are welding by electron beam welding.

Separately from this, a negative terminal substrate 14 (see FIG. 6) is produced. Concretely, in an experiment, a deep drawing-purpose cold-rolled steel sheet (e.g., SPCE) was prepared, and was subjected to deep draw molding through the use of predetermined dies to provide a negative terminal substrate 14 as shown in FIG. 6. The negative terminal substrate 14 has a shaft-like portion 14k having a bottomed cylinder shape, a disc ring-shape brim portion 14b provided at a base end (a lower end in FIG. 6) of the shaft-like portion 14k, and a pair of rectangular platy connecting portions 14d that are provided radially outward of the brim portion 14b.

Among these portions, the shaft-like portion 14k has an outside diameter that allows the shaft-like portion 14k to be inserted into the penetration hole 111h of the side wall portion 111e of the battery container 111. The brim portion 14b has an outside diameter that is larger than the diameter of the penetration hole 111h. The brim portion 14b has, at or near the middle in the radial direction, an annular curved portion 14c having an arch shape in section. The annular curved portion 14c has a protruded periphery surface 14e, and a protruded surface 14f that is protruded from the annular curved portion 14c toward the side of the distal end of the shaft-like portion 14k (upward in FIG. 6). In an experiment, due to the deep drawing molding, the protruded surface 14f had an increased surface roughness.

Figure 7:
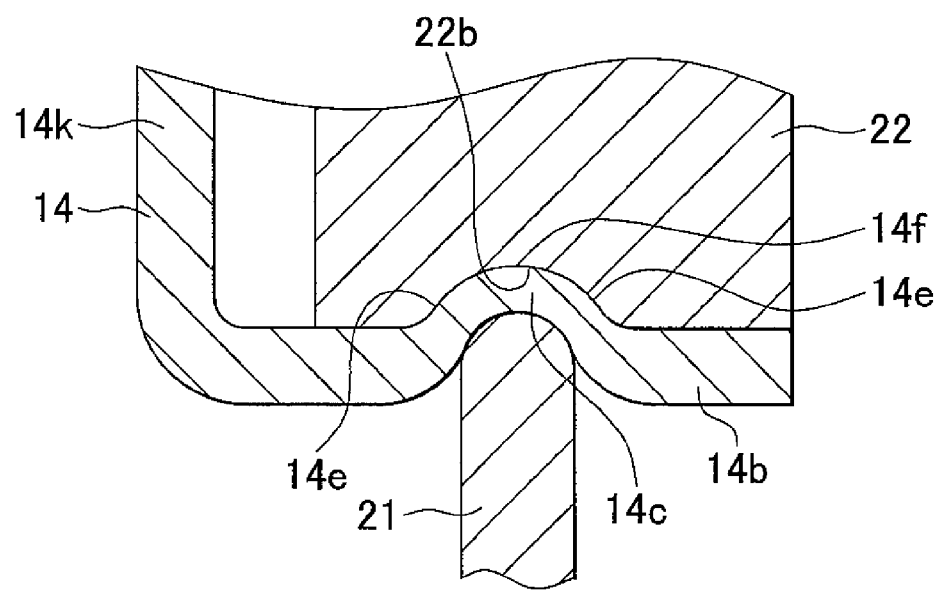
FIG. 7 is a diagram illustrating a surface roughness reducing process.

Next, in the working experiment, the protruded surface 14f of the negative terminal substrate 14 was subjected to the surface roughness reducing process through pressurization surface correction (hereinafter, referred to also as "surface beating"). Concretely, as shown in FIG. 7, the annular curved portion 14c of the negative terminal substrate 14 was disposed between a first correction die 21 and a second correction die 22. Next, by pressurizing the first correction die 21, the protruded surface 14f was pressed against a contact surface 22b of the second correction die 22 to perform surface correction. Due to this, the surface roughness of the protruded surface 14f was successfully made small.

Figure 8:
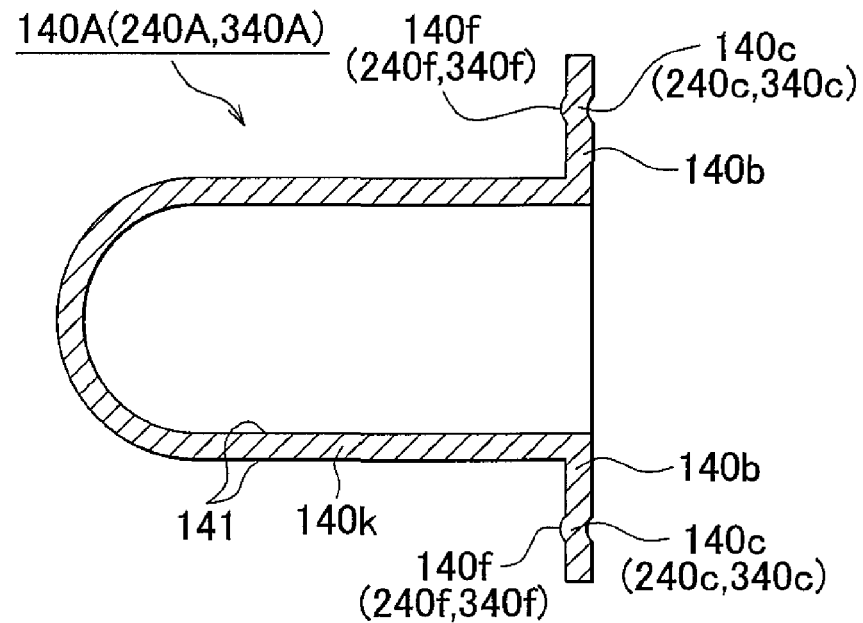
FIG. 8 is a sectional view of a negative terminal member 140A to 340A (a negative terminal 140 to 340 before being attached to a battery)

After that, the surface of the negative terminal substrate 14 that includes the protruded surface 14f was subjected to non-gloss electrolytic nickel plating. This provided a negative terminal member 140A as shown in FIG. 8 in which the surface including the seal surface 140f was formed by the nickel plating layer 141 provided after the deep draw molding. This negative terminal member 140A had a bottomed cylinder-shape shaft-like portion 140k, and a disc ring-shape brim portion 140b provided on the base end of the shaft-like portion 140k (on the right side thereof in FIG. 8). The brim portion 140b had, at or near the middle in the radial direction, an annular seal portion 140c having an arch shape in section. This seal portion 140c had a seal periphery surface 140e, and a seal surface 140f protruded from the seal periphery surface 140e toward the side of the distal end of the shaft-like portion 140k (leftward in FIG. 8).

In Embodiment 1, before the nickel plating layer 141 was formed, the surface roughness of the protruded surface 14f was reduced by surface beating. Therefore, the average value of the surface roughness Ry of the seal surface 140f was made as small as about 3 μm. Furthermore, as shown in FIG. 11, the maximum value of the surface roughness Ry in Embodiment 1 was about 7 μm. The results indicate that Embodiment 1 achieved not merely a small average value of the surface roughness Ry of the seal surface 140f, but also a small dispersion in the surface roughness Ry. Incidentally, in Embodiment 1, the protruded surface 14f of the negative terminal substrate 14 corresponds to a coated surface.

Next, as shown in FIG. 4, the negative terminals 140 were fastened to the hole periphery portions 111j of the side wall portion 111e of the battery container 111. Concretely, after the packing 145 was attached to one of the penetration holes 111h of the side wall portion 111e, the negative terminal 140k of a negative terminal member 140A was inserted from outside the battery container 111 into the battery container 111 through the penetration hole 111h. Next, fluid pressure was applied to the cylindrical interior space of the shaft-like portion 140k so that a distal end side portion (a left side portion in FIG. 4) of the negative terminal 140k expanded radially outward. Then, the negative terminal 140k was compressed in the axial direction (rightward in FIG. 4) to form the squeezed portion 140g. Therefore, the negative terminal 140 was fastened, via the packing 145, to the hole periphery portion 111j of the side wall portion 111e of the battery container 111.

At this time, as shown in FIG. 4, the squeezed portion 140g of the negative terminal 140, together with the hole periphery portion 111j, clamps and compresses the flange worked portion 145c of the packing 145 on the side of the inside surface 111m of the side wall portion 111e. Furthermore the brim portion 140b, together with the hole periphery portion 111j, clamps and compresses the flange portion 145b of the packing 145 on the side of the outside surface 111n of the side wall portion 111e. In Embodiment 1, in particular, the seal surface 140f can locally compress the flange portion 145b of the packing 145. Therefore, the penetration hole 111h can be sealed liquid-tightly.

Next, the positive collector member 120 joined to the positive plate 160 of the electrode body 150 was joined to the inside surface 115b of the opening closure member 115 by electron beam welding. Next, this joined unit was inserted from the negative collector member 130 side into the battery container 111 through the opening portion 111g. At this time, the battery container 111 was closed with the opening closure member 115. After that, by laser irradiation from outside, the opening closure member 115 and the battery container 111 were joined to seal the battery container 111. Next, laser was irradiated from outside the battery container 111 toward the squeezed portion 140g of the negative terminal 140 to join the squeezed portion 140g and the negative collector member 130. Then, the electrolyte solution was introduced through an inlet opening 111k located in a ceiling portion 111a of the battery container 111, and the safety valve 113 was attached to close the inlet opening 111k. After that, a predetermined process, including initial charging and the like, was performed to complete the alkaline storage battery 100.

(Embodiment 2) An alkaline storage battery 200 of Embodiment 2 is different from the alkaline storage battery 100 of Embodiment 1 merely in the negative terminals, while other features and the like remain the same. Concretely, as shown in FIG. 1 (FIG. 8), instead of the negative terminals 140 (the negative terminal members 140A) used in Embodiment 1, negative terminals 240 (negative terminal members 240A) were used in Embodiment 2.

Specifically, in Embodiment 1, in the production of the negative terminal members 140A, the protruded surface 14f of the negative terminal substrate 14 was subjected to the surface roughness reducing process (surface beating) through pressurization surface correction. Concretely, as shown in FIG. 7, the surface roughness of the protruded surface 14f was reduced by pressing the protruded surface 14f against the contact surface 22b of the second correction die 22.

On the other hand, in Embodiment 2, in the production of negative terminal members 240A (negative terminals 240 before being attached to the battery), the surface roughness of the protruded surface 14f was reduced by subjecting the negative terminal substrate 14 to centrifugal barrel grinding. In other features and the like, Embodiment 2 was substantially the same as Embodiment 1. The negative terminal member 240A having a nickel plating layer 141 as shown in FIG. 8 was produced. Due to this, the average value of the surface roughness Ry of the seal surface 240f of the negative terminal 240 was made about 2 μm. Furthermore, as shown in FIG. 11, the maximum value of the surface roughness Ry in Embodiment 2 was about 4 μm. The results indicate that Embodiment 2 achieved not merely a small average value of the surface roughness Ry of the seal surface 240f but also a small dispersion in the value of the surface roughness Ry.

(Embodiment 3) An alkaline storage battery 300 of Embodiment 3 is different from the alkaline storage battery 100 of Embodiment 1 merely in the negative terminals, while other features and the like remain the same Concretely, as shown in FIG. 1 (FIG. 8), instead of the negative terminals 140 (the negative terminal members 140A) used in Embodiment 1, negative terminals 340 (negative terminal members 340A) were used in Embodiment 3.

Specifically, in Embodiment 1, in the production of the negative terminal members 140A, the surface roughness of the protruded surface 14f of the negative terminal substrate 14 was reduced by subjecting the protruded surface 14f to the surface roughness reducing process through pressurization surface correction. On the other hand, in Embodiment 3, during the production of negative terminal members 340A, the surface roughness reducing process was not performed on the negative terminal substrate 14. That is, after the negative terminal substrate 14 was formed by deep draw molding, nickel plating was performed without performing the surface roughness reducing process on the protruded surface 14f and the like. In other features and the like, Embodiment 3 was substantially the same as Embodiment 1. The negative terminal member 340A having a nickel plating layer 141 as shown in FIG. 8 was produced.

Due to this, the average value of the surface roughness Ry of the seal surface 340f of the negative terminal 340 was made about 4.5 μm. Furthermore, as shown in FIG. 11, the maximum value of the surface roughness Ry in Embodiment 3 was about 8 μm. The results indicate that Embodiment 3 achieved not merely a small average value of the surface roughness Ry of the seal surface 340f but also a small dispersion in the value of the surface roughness Ry.

(Embodiment 4) An alkaline storage battery 400 of Embodiment 4 is different from the alkaline storage battery 100 of Embodiment 1 merely in the negative terminals, while other features and the like remain the same. Concretely, as shown in FIG. 1 (FIG. 9), instead of the negative terminals 140 (the negative terminal members 140A) used in Embodiment 1, negative terminals 440 (negative terminal members 440A) were used in Embodiment 4.

Specifically, in Embodiment 1, the negative terminal substrate 14 was produced through the use of a deep drawing-purpose cold-rolled steel sheet (SPCE). On the other hand, in Embodiment 4, a negative terminal substrate 14 was produced through the use of a nickel-plated steel sheet obtained by plating the surface of the SPCE with nickel.

Figure 9:
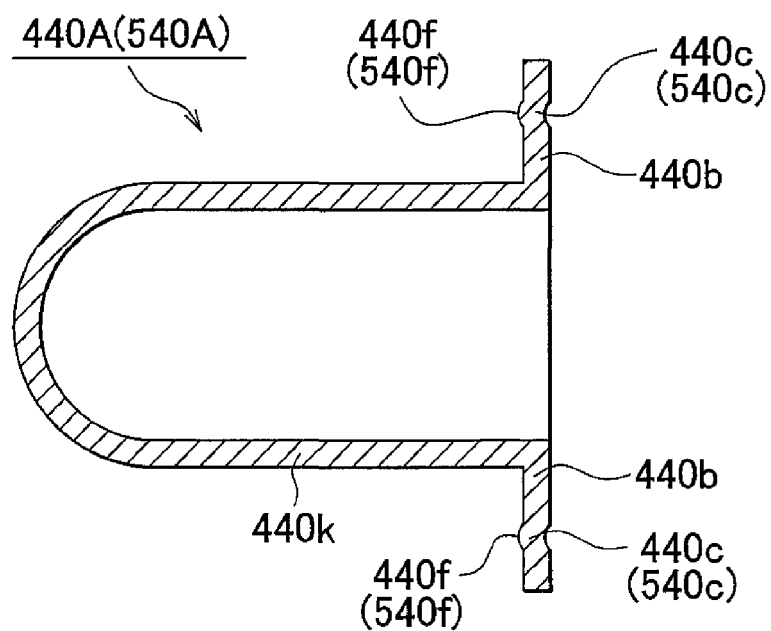
FIG. 9 is a sectional view of a negative terminal member 440A, 540A (a negative terminal 440, 540 before being attached to a battery)

Furthermore, in Embodiment 1, the negative terminal member 140A was produced by performing nickel plating after performing the surface roughness reducing process on the protruded surface 14f of the negative terminal substrate 14. On the other hand, in Embodiment 4, the negative terminal member 440A as shown in FIG. 9 was produced without performing nickel plating after performing the surface roughness reducing process on the protruded surface 14f of the negative terminal substrate 14 as in Embodiment 1. Therefore, the negative terminal 440 of Embodiment 4 was different from the negative terminal 140 of Embodiment 1, in that iron was exposed in the seal surface 440f.

The average value of the surface roughness Ry regarding the seal surface 440f of the negative terminal 440 was about 2.5 μm. Furthermore, as shown in FIG. 11, the maximum value of the surface roughness Ry in Embodiment 4 was about 5 μm. The results indicate that Embodiment 4 achieved not merely a small average value of the surface roughness Ry of the seal surface 440f but also a small dispersion in the value of the surface roughness Ry.

(Embodiment 5) An alkaline storage battery 500 of Embodiment 5 is different from the alkaline storage battery 100 of Embodiment 1 merely in the negative terminals, while other features and the like remain the same. Concretely, as shown in FIG. 1 (FIG. 9), instead of the negative terminals 140 (the negative terminal members 140A) used in Embodiment 1, negative terminals 540 (negative terminal members 540A) were used in Embodiment 5.

Specifically, in Embodiment 1, the negative terminal substrate 14 was produced through the use of a deep drawing-purpose cold-rolled steel sheet (SPCE). On the other hand, in Embodiment 5, a negative terminal substrate 14 was produced through the use of a nickel-plated steel sheet obtained by plating the surface of the SPCE with nickel. Furthermore, in Embodiment 1, the protruded surface 14f of the negative terminal substrate 14 was subject to surface beating. On the other hand, in Embodiment 5, the negative terminal substrate 14 was subjected to centrifugal barrel grinding.

Furthermore, in Embodiment 1, the negative terminal member 140A was produced by performing nickel plating after performing the surface roughness reducing process on the protruded surface 14f of the negative terminal substrate 14. On the other hand, in Embodiment 5, the negative terminal member 540A as shown in FIG. 9 was produced without performing nickel plating after performing the centrifugal barrel grinding on the negative terminal substrate 14. Therefore, the negative terminal 540 of Embodiment 5 was different from the negative terminal 140 of Embodiment 1, in that iron was exposed in the seal surface 540f.

The average value of the surface roughness Ry regarding the seal surface 540f of the negative terminal 540 was about 2 µm. Furthermore, as shown in FIG. 11, the maximum value of the surface roughness Ry in Embodiment 5 was about 4.5 µm. The results indicate that Embodiment 5 achieved not merely a small average value of the surface roughness Ry of the seal surface 540f but also a small dispersion in the value of the surface roughness Ry.

(Comparative Example 1) An alkaline storage battery of Comparative Example 1 is different from the alkaline storage battery 400 of Embodiment 4 merely in the negative terminals, while other features and the like remain the same. Concretely, in Embodiment 4, in the production of the negative terminal members 440A, the protruded surface 14f of the negative terminal substrate 14 was subjected to the surface roughness reducing process.

On the other hand, in Comparative Example 1, in the production of negative terminal members, the negative terminal substrate 14 was not subjected to the surface roughness reducing process. That is, after the negative terminal substrate 14 was formed by the deep draw molding of a nickel-plated steel sheet, the surface roughness reducing process was not performed on the protruded surface 14f or the like, but the obtained negative terminal substrate was directly used as a negative terminal member Therefore, in Comparative Example 1, the average value of the surface roughness Ry regarding the seal surface of the negative terminal was about 17 µm. Furthermore, in the seal surface, the nickel plating layer had cracks, and partially ion was exposed. Still further, as shown in FIG. 11, in Comparative Example 1, the maximum value of the surface roughness Ry was as large as about 30 µm. The results indicate that Comparative Example 1 had not merely a larger value of the surface roughness Ry regarding the seal surface of the negative terminal, but also a larger dispersion in the value of the surface roughness Ry than Embodiments 1 to 5.

(Leak Test) A leak test was performed on the alkaline storage batteries 100 to 500 in accordance with Embodiments 1 to 5 and the alkaline storage battery in accordance with Comparative Example 1 were subjected to a leak test. Concretely, the alkaline storage battery 100 in accordance with Embodiment 1 was charged to an SOC of 60%. After that, the creep phenomenon of the alkaline electrolyte was accelerated by leaving the alkaline storage battery 100 in a chamber set at a temperature of 60° C. and a humidity of 75%, for 83 days. Then, after the alkaline storage battery 100 was taken out of the chamber, a negative terminal 140-side portion of the alkaline storage battery 100 was dipped in 100 mL of pure water at 60° C.

Then, using an ICP analysis device, the concentration (mg/L) potassium ions contained in 100 mL of pure water was measured. After that, on the basis of the measured concentration (mg/L) of potassium ions, the amount of leakage of the alkaline electrolyte (µL) was calculated. In this embodiment, thirty alkaline storage batteries 100 of Example 1 were prepared, and the leak test was performed on each of the alkaline storage devices 100. For the alkaline storage devices 100, the amounts (µL) of leakage of the alkaline electrolyte were calculated and an average value thereof (referred to as "average amount of leakage") was obtained.

Figure 10:
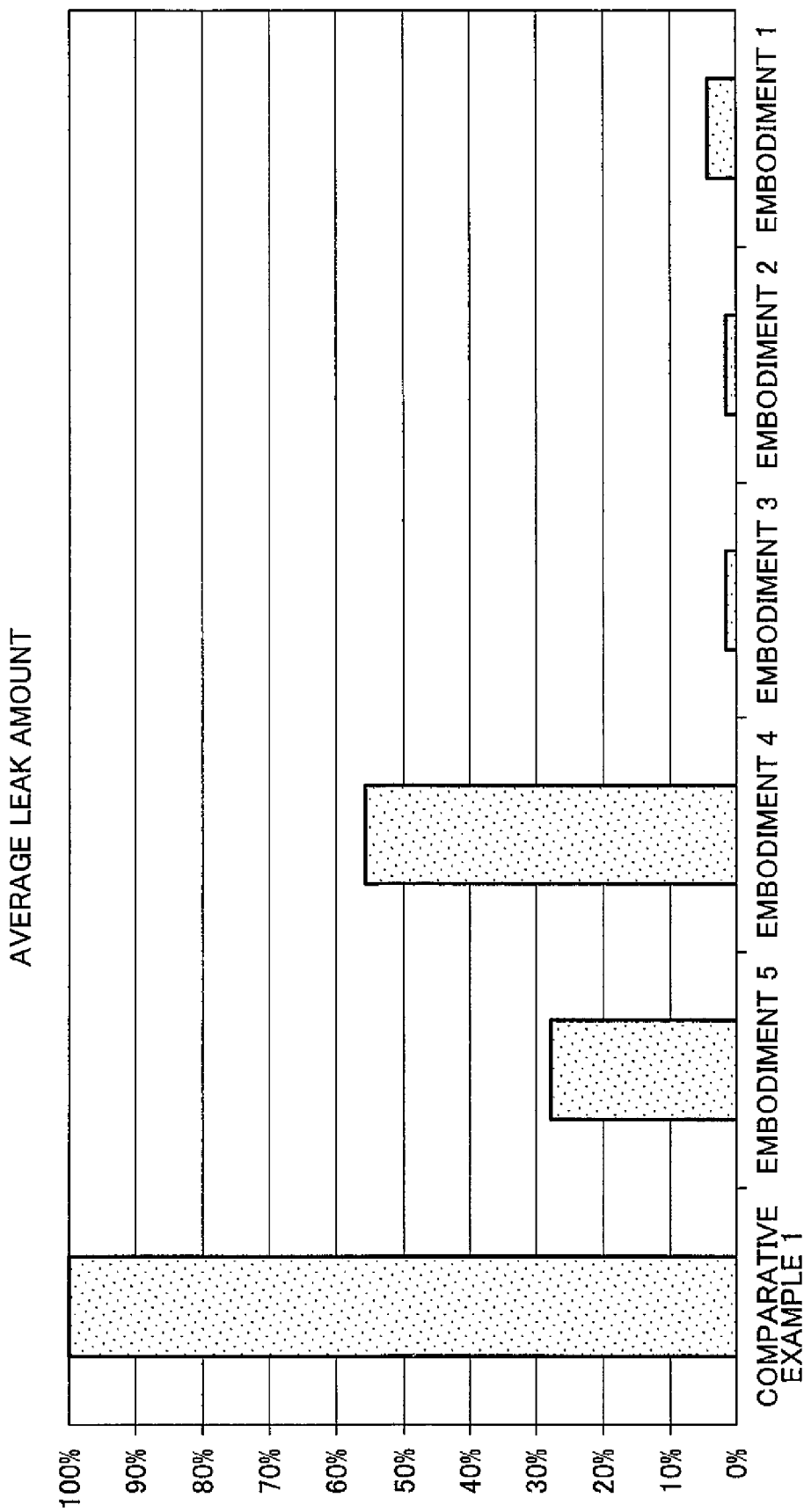
FIG. 10 is a graph indicating results of a leak test.

Thirty alkaline storage batteries in accordance with each of Embodiments 2 to 5 and Comparative Example 1 were prepared, and the leak test was performed on each battery similarly to the alkaline battery cell 100 in accordance with Embodiment 1, and an average amount of leakage of the alkaline electrolyte was calculated. Results are shown in FIG. 10. In FIG. 10, the average leak amount of the alkaline storage battery in accordance with Comparative Example 1 was set as a reference (100%), and the average leak amounts of the alkaline storage batteries of Embodiments 1 to 4 are shown in terms of the proportion (%) to the average leak amount of the alkaline storage battery in accordance with Comparative Example 1.

Firstly, the results of the alkaline storage batteries 400, 500 of Embodiments 4, 5 and the alkaline storage battery in accordance with Comparative Example 1 will be compared. These alkaline storage batteries were in the relationship in which the materials of the negative terminals were the same (they were all made of a nickel-plated steel sheet) and there was difference only in the surface roughness reducing process of the seal surface of the negative terminals. Concretely, as for the alkaline storage batteries of Comparative Example 1, the seal surfaces of the negative terminals were not subjected to the surface roughness reducing process at all after the deep draw molding, and the average value of the surface roughness Ry of the seal surfaces was about 17 µm. In contrast, as for the alkaline storage batteries 400 of Embodiment 4, the seal surfaces of the negative terminals were subjected to surface beating, and the average value of the surface roughness Ry of the seal surfaces was about 2.5 µm. As for the alkaline storage batteries 500 of Embodiment 5, the surfaces of the negative terminals, including the seal surfaces, were subjected to centrifugal barrel grinding, and the average value of the surface roughness Ry of the seal surfaces was about 2 µm.

As for the alkaline storage batteries 400 of Embodiment 4, the average leak amount was about 55%. That is, in comparison with the alkaline storage batteries of Comparative Example 1, the leak amount was reduced by about 45%. As for the alkaline storage batteries 500 of Embodiment 5, the average leak amount was about 28%. That is, in comparison with the alkaline storage batteries of Comparative Example 1, the leak amount was reduced by as much as about 72%. From these results, it can be said that the leakage of the alkaline electrolyte to the outside along the surfaces of the negative terminals can be restrained by performing surface beating or grinding on the seal surfaces after the negative terminals have been formed by deep draw molding (after the seal portions have been formed by press molding). It can be considered that, by performing surface beating or the grinding on the seal surfaces, the surface roughness Ry of the seal surfaces was reduced to or below 15 μm (concretely, the surface roughness Ry was reduced to about 2.5 μm or about 2 μm).

Next, the results of the alkaline storage batteries 100 to 300 of Embodiments 1 to 3 and the alkaline electrolyte of Comparative Example 1 will be compared. These alkaline storage batteries are in a relationship where they are different as to whether the surfaces of the negative terminals, including the seal surfaces, were subjected to nickel plating after the negative terminals were formed by deep draw molding. Concretely, as the alkaline storage batteries 100 to 300 of Embodiments 1 to 3, nickel plating was performed after the deep draw molding. However, as for the alkaline storage batteries of Comparative Example 1, nickel plating was not performed after the deep draw molding.

The average leak amounts of the alkaline storage batteries 100 to 300 of Embodiment 1 to 3 were about 5%, about 2% and about 2%, respectively That is, in comparison with the alkaline storage batteries of Comparative Example 1, the leak amount was reduced by as much as 95% or more. From these results, it can be said that the leakage of the alkaline electrolyte to the outside along the surfaces of the negative terminals can be restrained by performing nickel plating after the deep draw molding so that the seal surfaces are formed by the nickel plating layer. This is considered to be because although the negative terminal substrate was formed of SPCE, the following coating of the seal surfaces and the like with nickel plating prevented exposure of iron in the seal surfaces and the like. It is considered that this restrained the creep phenomenon of the alkaline electrolyte on the seal surfaces and the like.

In the alkaline storage batteries of Comparative Example 1, the negative terminals were formed of a nickel-plated steel sheet, and an extremely increased leak amount resulted in comparison with the alkaline storage batteries 100 and the like whose negative terminals were subjected to nickel plating after the deep draw molding thereof. This is considered to be because when the nickel-plated steel sheet was deep-draw-molded, cracks and the like were formed so that iron was exposed in the seal surfaces.

The average values of the surface roughness Ry of the seal surfaces of the negative terminals of the alkaline storage batteries 100 to 300 of Embodiments 1 to 3 were about 3 μm, about 2 μm and 4.5 μm, respectively. On the other hand, as for the alkaline storage batteries of Comparative Example 1, the average value of the surface roughness Ry of the seal surfaces was about 17 μm. From this, it can be said that by limiting the surface roughness Ry of the seal surfaces of the negative terminals to 15 μm or less, the leakage of the alkaline electrolyte to the outside along the surfaces of the negative terminals can be restrained.

While the invention has been described with reference to Embodiments 1 to 5, the invention is not limited to the foregoing embodiments. On the contrary, it is apparent that the invention is applicable with appropriate modifications without departing from the spirit of the invention. For example, in Embodiments 1 to 5, a nickel-metal hydride storage battery is used as the alkaline storage batteries 100 to 500. However, the invention is also applicable to any alkaline storage battery that incorporates an alkaline electrolyte.

Furthermore, Embodiments 1 to 5 have been described in conjunction with an alkaline storage battery (concretely, a nickel-metal hydride storage battery) whose battery case 110 is a positive pole, and which has the negative terminals 140 to 540 as electrode terminals. However, the invention is also applicable to an alkaline storage battery of an opposite arrangement in which the battery case 110 is a negative pole, and positive terminals are provided as electrode terminals. In this nickel-metal hydride storage battery, too, the invention is able to appropriately restrain the leakage of the alkaline electrolyte to the outside along the surfaces of the positive terminals. Furthermore, the invention is also applicable to an alkaline storage battery having positive terminals and negative terminals, that is, the invention is also able to restrain the leakage of the alkaline electrolyte along the surfaces of the positive terminals and the negative terminals.

What is claimed is:
1. An alkaline storage battery comprising:
a battery case that has an external wall portion which has an inside surface and an outside surface, and which includes a penetration hole penetrating between the inside surface and the outside surface;
an alkaline electrolyte located in the battery case;
a packing that intimately contacts a hole periphery portion of the external wall portion that surrounds the penetration hole, the packing including a flange portion positioned outside the battery case, and a flange worked portion positioned inside the battery case; and
an electrode terminal inserted in the penetration hole, disposed astride an inside of the battery case and an outside of the battery case, and fastened to the hole periphery portion via the packing, the electrode terminal made of a metal sheet material that contains iron as a main component,
the electrode terminal including: a cylinder-shape internal cylinder portion located inside the penetration hole with the packing disposed therebetween, a ring-shape brim portion, which is larger in diameter than the penetration hole and is located on an end side of the internal cylinder portion, and a disc-shape squeezed portion, which is larger in diameter than the penetration hole which is located on another end side of the internal cylinder portion, and which is compressed along an axial direction of the electrode terminal,
wherein the squeezed portion clamps and compresses the flange worked portion of the packing, on the inside surface side of the external wall portion, and the brim portion clamps and compresses the flange portion of the packing, on the outside surface of the external wall portion,
wherein the brim portion is a seal portion that, together with the hole periphery portion, clamps and directly compresses the packing to liquid-tightly seal the penetration hole, and
wherein the seal portion includes an annular seal surface which directly contacts the flange portion, and a seal periphery surface located around a periphery of the annular seal surface, wherein a surface roughness Ry of the annular seal surface is approximately 15 μm or less and is smaller than a surface roughness Ry of the seal periphery surface, and the seal portion has an arch shape in section which protrudes from the seal periphery surface toward the hole periphery portion, so that the seal portion prevents the alkaline electrolyte from leaking out along the annular seal surfaces of the electrode terminal, wherein Ry is a difference between peaks and troughs of the annular seal surface roughness and the seal periphery surface roughness, respectively, and wherein a nickel plating layer is disposed on the annular seal surfaces.

2. The alkaline storage battery according to claim 1, wherein the annular seal surface which protrudes from the seal periphery surface toward the hole periphery portion locally compresses the packing.

* * * * *